(12) United States Patent
Jabaji

(10) Patent No.: US 7,397,224 B2
(45) Date of Patent: Jul. 8, 2008

(54) VOLTAGE REGULATOR WITH IMPROVED PROTECTION AND WARNING SYSTEM

(75) Inventor: Issam Jabaji, Glenview, IL (US)

(73) Assignee: C. E. Niehoff & Co., Evanston, IL (US)

( * ) Notice: Subject to any disclaimer, the term of this patent is extended or adjusted under 35 U.S.C. 154(b) by 0 days.

(21) Appl. No.: 11/894,285

(22) Filed: Aug. 20, 2007

(65) Prior Publication Data

US 2008/0012537 A1 Jan. 17, 2008

Related U.S. Application Data

(62) Division of application No. 11/158,799, filed on Jun. 22, 2005, now Pat. No. 7,276,804.

(51) Int. Cl.
*H02H 7/06* (2006.01)
(52) U.S. Cl. ............... 322/28; 322/11; 322/17; 322/23; 322/24; 322/27; 322/33; 322/34
(58) Field of Classification Search ........... 322/28, 322/11, 17, 23, 24, 27, 33, 34
See application file for complete search history.

(56) References Cited

U.S. PATENT DOCUMENTS

| 4,255,789 | A | 3/1981 | Hartford et al. |
|---|---|---|---|
| 4,348,629 | A | 9/1982 | Sievers |
| 4,379,990 | A | 4/1983 | Sievers et al. |
| 4,973,896 | A | 11/1990 | Shiga et al. |
| 5,166,594 | A | 11/1992 | Schramm et al. |
| 5,254,935 | A | 10/1993 | Vercesi et al. |
| 5,298,851 | A | 3/1994 | DeNardis |
| 5,376,876 | A | 12/1994 | Bauser et al. |
| 5,907,233 | A * | 5/1999 | Jabaji ............ 322/28 |
| 6,184,661 | B1 | 2/2001 | Becker et al. |
| 6,465,908 | B1 * | 10/2002 | Karuppana et al. ......... 307/31 |
| 6,565,884 | B2 | 5/2003 | Nimni |
| 6,656,884 | B2 * | 12/2003 | Klintz et al. ............ 504/243 |
| 6,670,792 | B1 | 12/2003 | Renehan |
| 2001/0050544 | A1 | 12/2001 | Maggioni et al. |
| 2003/0039130 | A1 | 2/2003 | Curtiss |
| 2003/0057925 | A1 | 3/2003 | Harmon |

FOREIGN PATENT DOCUMENTS

AU 597900 6/1978

\* cited by examiner

*Primary Examiner*—Darren Schuberg
*Assistant Examiner*—Iraj A Mohandesi
(74) *Attorney, Agent, or Firm*—Law Offices of Michael M. Ahmadshahi

(57) ABSTRACT

This invention discloses a vehicle electrical system voltage regulator with improved electrical protection and warning means that discerns and responds to regulator, generator, or vehicle electrical system operation and malfunctions. The regulator includes monitoring, control, and protection circuits with a phase signal monitor, a field switching circuit that operates the field coil in response to electrical power demands, and a field enable switch in series with the field regulating switch. The phase monitor and protection circuit ascertains and transmits generator rotational motion for use by the monitoring and control circuit in discerning the various operating conditions. The monitoring and control circuit operates on the field switching circuit to meet the electrical power demands and provide multi level fault protection to include field switching circuit reconfiguration to continue operating under various fault conditions. A warning and diagnostic system incorporating visual indicators and communication lines provide descriptive system information for use by the vehicle's operator and computer network, respectively.

21 Claims, 7 Drawing Sheets

VOLTAGE REGULATOR WITH IMPROVED PROTECTION AND WARNING SYSTEM

CROSS REFERENCE TO RELATED APPLICATIONS

The present patent application is a division of a non-provisional patent application entitled "Voltage Regulator With Improved Protection and Warning System," filed Jun. 22, 2005, as U.S. patent application Ser. No. 11/158,799 by the same inventor now U.S. Pat. No. 7,276,804. This patent application claims the benefit of the filing date of the cited non-provisional patent application according to the statutes and rules governing non-provisional patent applications, particularly 35 USC §§120, 121, and 37 CFR §1.78. The specification and drawings of the cited non-provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to vehicle electrical systems comprising a generator which includes a voltage regulator. In particular, this invention relates to a voltage regulator, comprising a system and method, which monitors, controls, and protects the vehicle electrical system by ascertaining operating states of its own and said generator.

BACKGROUND

The present invention relates to vehicle electrical systems which comprise a generator including a voltage regulator and electrical components. Such electrical components include, but are not limited to, one or more stored energy sources, electrical loads such as instrumentation, electronic vehicle control systems, heating elements, lights, stereo systems, wiring system, and/or any other electrical device which may either supply or consume electrical energy to or from said vehicle electrical system. More specifically, the present invention focuses on a voltage regulator, including a system and method, which may be utilized in a vehicle electrical system to provide improved electrical protection, continued regulated operation, and warning to the vehicle electrical system even in the event of various electrical failures. The voltage regulator is configured to monitor, control, and protect said electrical components, generator, and its own system and operation, by including a monitor/control/protection (MCP) circuit and a field switching (FS) circuit. Of particular utility, said MCP and FS circuits are configured to discern and respond to various failure modes of the vehicle electrical system. The voltage regulator is further capable of reconfiguring its components to allow it to continue normal operation even when certain components fail to function properly. More specifically, the MCP circuit is capable of reconfiguring a protective component of the FS circuit to function as an operative component when the operative component of the FS circuit fails to function properly.

Vehicle electrical systems are normally comprised of electrical components, such as the above mentioned devices, and a generator including a voltage regulator. The generator supplies electrical power to the vehicle electrical system when the vehicle's engine is operating. The voltage regulator's primary function is to regulate the generator's output power at a specific reference voltage. Modern voltage regulators also function to monitor and control the generator's performance to protect the vehicle electrical system, see for example Becker et al., U.S. Pat. No. 6,184,661, and Jabaji, U.S. Pat. No. 5,907,233. It is desirable, however, to monitor and control not only the generator's performance, but also that of the voltage regulator and the rest of the vehicle electrical system, and further to be able to discern, respond, and communicate the failure modes of these components to the vehicle's computer network and/or the vehicle's operator. It is also desirable to be able to reconfigure the voltage regulator's components so that it may continue normal operation without the use of additional redundant components.

The generator converts an engine's mechanical power into electrical power. The engine's mechanical power, in the form of a torque at a rotational speed, is exerted on the generator via a coupling mechanism, such as a drive belt. When the generator's field coil conducts electric current while the rotor is turning, the stators experience changing magnetic flux that induces alternating electric current which is converted to direct current by rectifiers. The voltage regulator is designed to regulate the output power of said generator by switching on/off the generator's field coil. Specifically, the regulator seeks to maintain the generator output power at a specific operating voltage, for example 28 Volts. A vehicle electrical system is designed to operate within a designated range of this operating voltage, for instance ±0.5 Volts. Voltage variations beyond this envelope, signified as over voltage and under voltage conditions, may cause damage to the vehicle electrical system. Over voltage may burn electrical components, while under voltage may deplete the batteries to the point of disabling the vehicle.

Over voltage and under voltage conditions may occur as a result of a malfunctioning generator, voltage regulator, and/or faulty vehicle electrical components. Generator failure may occur as a result of a faulty field coil, stator winding, or diode trio, to name a few examples. Voltage regulator failure may occur as a result of a faulty switching transistor. A vehicle electrical circuit component, such as the cable connecting the generator to the battery, may result in an open battery circuit if it breaks or becomes unfastened due to excessive vibrations.

A common design of generators is such that the field coil is connected to the vehicle battery at one end, and grounded at the other end via a switching transistor included in the voltage regulator. The voltage regulator senses the generator output voltage and controls the field coil current to maintain a constant voltage according to the regulator's internal voltage reference as external electrical loads within the limits of the generator output power capacity are added and removed. This is generally achieved by making current flow through the field winding whenever output voltage drops below the reference voltage, and stopping the flow of current through the field winding whenever the output voltage rises above the reference voltage. The voltage regulator switches on/off the field coil by turning on/off its field switching transistor.

It is possible for the generator to cause an over voltage or an under voltage condition, irrespective of the voltage regulator's operating states. For instance, a generator whose field coil has made contact with the generator's frame may conduct field current to cause an over voltage condition even though the voltage regulator has turned off its field switching transistor. Alternatively, an under voltage condition may occur if the generator's stator windings or output connector develop a fault that reduces the generator output, even though the voltage regulator is performing properly.

It is similarly possible that the voltage regulator may cause an over voltage or an under voltage condition, irrespective of the generator's operating states. If a voltage regulator's field switching transistor fails in a short circuit mode it causes an over voltage condition. If a voltage regulator's field switching transistor fails in an open circuit mode it causes an under voltage condition. Such over voltage and under voltage conditions may occur even though the generator is properly performing its operation.

Although various systems have been proposed which touch upon some aspects of the above problems, they do not provide solutions to the existing limitations in monitoring, controlling, and protecting the vehicle electrical system. For example, the Renehan patent, U.S. Pat. No. 6,670,792 discloses electrical circuitry, apparatus, and methods of operation of said structures for regulating electrical power output by a generator via sensing current flow through the field coil of said generator, but does not provide the protection and warning capabilities of the present invention. The Karlich patent, AU 597900, discloses a voltage regulator circuit which includes an over voltage protection circuitry due to faulty wire connections, but does not discern and/or respond to other modes of failures. In Schramm et al., U.S. Pat. No. 5,162,720, the means for recognition of faults and protection includes an additional voltage regulator device, which is independent of the voltage regulator and operates in place of the voltage regulator when there is a defective connection in the voltage regulator, while in the present invention there is no need for an additional voltage regulator. Therefore, there is a need for a voltage regulator that can discern and protect against the vehicle electrical system failures. There is also a need for a voltage regulator that can reconfigure certain internal components in order to continue normal operation without implementing additional redundant systems. It is also highly desirable to have a warning and diagnostic system, incorporating visual indicators and communication lines, to provide descriptive system information for use by the vehicle's operator and computer network, respectively.

Modern vehicles rely heavily on their on-board electrical power generating device. A generator including a voltage regulator is such device. The voltage regulator functions to control and manage the electrical power generated by the generator. Vehicle electrical components may be damaged if either the generator or voltage regulator malfunctions. A voltage regulator that can properly protect against these malfunctions, irrespective of which device is the cause of the malfunction, and is able to reconfigure its components in order to maintain system operation under a variety of faults is desired. Furthermore, a voltage regulator that is capable of discerning and communicating vehicle electrical system failures to either the vehicle operator or computer network is needed.

SUMMARY

The present invention discloses a voltage regulator, including a system and method, which provides improved protection and warning to a vehicle electrical system. Preferably, the voltage regulator is coupled with a generator, included in the vehicle electrical system, wherein the voltage regulator ascertains both its own operating states and those of the generator's and responds accordingly. Thus, the voltage regulator is capable of discerning between voltage regulator failure and generator failure. The voltage regulator is further capable of reconfiguring a protective component to function as an operative component, when the latter fails to function properly. The voltage regulator comprises a monitor/control/protection (MCP) circuit and a field switching (FS) circuit. The voltage regulator is configured such that the MCP circuit receives input signals to determine the operating states of the generator and the FS circuit. The FS circuit, comprising a field enable switch and a field regulating switch, operates on the generator's field coil to regulate the generator's output power and to provide a redundant mechanism for improved protection and system reliability. The field regulating switch switches on/off the field coil to regulate the generator's output power while the field enable switch activates/deactivates the field regulating switch in order to provide redundant protection to the vehicle electrical system. In the event that the field regulating switch fails in a short circuit mode, the MCP circuit reconfigures the field enable switch to function as the field regulating switch, i.e. switch on/off the field coil in order to maintain the generator output power at a specific operating voltage. The voltage regulator is further configured to provide warning and diagnostic signals to the vehicle electrical system.

In one aspect, a vehicle electrical system is disclosed comprising a generator and a voltage regulator connected to and in communication with the generator and the vehicle electrical system. The voltage regulator is configured to ascertain its own operating states and those of the generator's, and to provide improved protection and warning to the vehicle electrical system. Preferably, the voltage regulator is configured such that the MCP circuit receives an output signal from the generator's output terminal and a field coil feedback signal form the FS circuit, in order to ascertain the operating states of the generator and voltage regulator. In one instance, the MCP circuit monitors the output signal and the field coil feedback signal and activates the field coil when a voltage of said output signal resides within a pre-determined output voltage range and the field coil feedback signal corresponds to the FS circuit switching on/off the field coil at least once within a pre-determined time interval. The MCP circuit deactivates the field coil when either the output signal or the field coil feedback signal fails to meet the described conditions. In one instance, the voltage regulator is configured such that the MCP circuit further monitors a voltage level of a battery coupled with the generator and re-activates the field coil when the voltage level falls below a pre-determined value, for example, 90% of the battery nominal voltage. In another instance, the voltage regulator is configured such that the MCP circuit re-activates the field coil when a signal is received from a supervisory system.

In another aspect, a vehicle electrical system is disclosed comprising a generator and a voltage regulator connected to and in communication with the generator and the vehicle electrical system. The voltage regulator is configured to ascertain its own operating states and those of the generator's, and to provide improved protection and warning to the vehicle electrical system. Preferably, the system further includes status indicators in order to provide status information regarding the operating states of the generator and voltage regulator. Preferably, the voltage regulator comprises visual indicators, such as light emitting diodes (LEDs) which generate flashing light patterns indicative of said operating states. The voltage regulator may include a diagnostic terminal where a diagnostic signal is provided regarding the operating states of the generator and voltage regulator. The voltage regulator may further incorporate a communication port where the operating states are communicated to a computer system of the vehicle.

In another aspect, a vehicle electrical system is disclosed comprising a generator and a voltage regulator connected to and in communication with the generator and the vehicle electrical system. The voltage regulator is configured to ascertain its own operating states and those of the generator's, and to provide improved protection and warning to the vehicle electrical system. Preferably, the voltage regulator is configured such that the FS circuit deactivates the field coil when there is excessive electrical current passing through it. In one instance, a turn-to-turn short in the generator's field coil causes excessive electrical current in both the field enable switch and the field regulating switch. These switches automatically turn off when excessive electrical current passes through them. In another instance, a field coil that has made contact with ground in places other than its ground lead continues to conduct current even after the FS circuit is off. Under this condition also, the field enable switch and field regulating switches turn off independently, thus providing a redundant system to inhibit failure effects.

In another aspect, a vehicle electrical system is disclosed comprising a generator and a voltage regulator connected to and in communication with the generator and the vehicle electrical system. The voltage regulator is configured to ascertain its own operating states and those of the generator's, and to provide improved protection and warning to the vehicle electrical system. Preferably, the system is further configured such that the generator comprises a phase terminal and an energize terminal. The phase terminal carries an alternating current (AC) signal proportional to a rotational speed of the generator's rotary shaft, and the energize terminal carries an energize signal indicating an on/off state of the vehicle engine. The MCP circuit is further configured to receive these signals to assist in determining the operating states of the generator and voltage regulator. In one instance, the MCP circuit monitors the AC signal and the energize signal and activates the field coil when both signals are present, and deactivates it when either signal is absent.

In another aspect, a vehicle electrical system is disclosed comprising a generator and a voltage regulator connected to and in communication with the generator and the vehicle electrical system. The voltage regulator is configured to ascertain both its own operating states and those of the generator, and to provide improved protection and warning to the vehicle electrical system. Preferably, the voltage regulator comprises a processor and a field switching circuit. The voltage regulator is configured such that the processor receives input signals, similar to those received by the MCP circuit, to determine the operating states of the generator and voltage regulator. In one instance, the processor monitors the output signal and the field coil feedback signal and activates the field coil when a voltage of said output signal resides within a pre-determined output voltage range and the field coil feedback signal corresponds to the FS circuit switching on/off the field coil at least once within a pre-determined time interval. The processor deactivates the field coil when either the output signal or the field coil feedback signal fails to meet the described conditions.

In another aspect, a vehicle electrical system is disclosed comprising a generator and a voltage regulator connected to and in communication with the generator and the vehicle electrical system. The voltage regulator is configured to ascertain both its own operating states and those of the generator, and to provide improved protection and warning to the vehicle electrical system. Preferably, the voltage regulator comprises a processor and a field switching circuit, wherein the field switching circuit comprises a field enable switch and a field regulating switch. In one instance, the processor monitors the field coil feedback signal and reconfigures the field enable switch to function as the field regulating switch when the latter fails to operate properly. Specifically, the processor switches on/off the field enable switch when the field coil feedback signal indicates that the field regulating switch has not switched on/off the field coil at least once within a pre-determined time interval.

In another aspect, a vehicle electrical system is disclosed comprising a generator and a voltage regulator connected to and in communication with the generator and the vehicle electrical system. The voltage regulator is configured to ascertain its own operating states and those of the generator's, and to provide improved protection and warning to the vehicle electrical system. Preferably, the voltage regulator comprises a processor and a field switching (FS) circuit. The FS circuit comprises a field enable switch and a first and a second field regulating switches. The field enable switch operates on both the first and second field regulating switches which are connected in parallel. This configuration permits the voltage regulator to work properly even when the field enable switch fails in a short-circuit mode and the first or second field regulating switches fail in a short-circuit and/or open-circuit mode, simultaneously.

In another aspect, a vehicle electrical system is disclosed comprising a generator and a voltage regulator connected to and in communication with the generator and the vehicle electrical system. The voltage regulator is configured to ascertain its own operating states and those of the generator's, and to provide improved protection and warning to the vehicle electrical system. Preferably, the voltage regulator comprises a processor and a field switching (FS) circuit. The FS circuit comprises a first and a second field enable switches and a first and a second field regulating switches. The first pair, comprising the first enable switch and the first regulating switch which are connected in series, and the second pair, comprising the second enable switch and the second regulating switch are also connected in series, wherein both pairs operate on the field coil independently. This configuration permits the voltage regulator to operate properly even when both a field enable switch and a field regulating switch fail simultaneously in either a short-circuit and/or an open-circuit mode.

In one aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method comprises monitoring an output of the generator and a field switching (FS) circuit of the voltage regulator to ascertain one or more operating states of said generator and voltage regulator, and activating/deactivating the generator's field coil via said FS circuit according to the ascertained operating states. In one instance, the method comprises activating the field coil when the generator's output voltage is within a pre-determined output voltage range and a switching interval of the FS circuit is within a pre-determined time interval, and deactivating said field coil if these conditions are not met. In another instance, the method further comprises re-activating the field coil when a voltage level of a battery, coupled with the vehicle electrical system, falls below a pre-determined value.

In another aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method comprises monitoring an FS circuit of the voltage regulator and reconfiguring a protective component of the FS circuit to function as an operative component of the FS circuit when the latter fails to function properly. More specifically, the method comprises reconfiguring the protective component to switch on/off the generator's field coil when the operative component fails to switch on/off the field coil.

In another aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method comprises monitoring an output of the generator and a switching interval of a field regulating switch included in a field switching (FS) circuit of the voltage regulator to ascertain one or more operating states of said generator and voltage regulator, and activating/deactivating the generator's field coil via a field enable switch included in the FS circuit according to the ascertained operating states. In one instance, the method comprises activating the field coil when the generator's output voltage is within a pre-determined output voltage range and the switching interval of the field regulating switch is within a pre-determined time interval, and deactivating said field coil if these conditions are not met.

In another aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method comprises monitoring a switching interval of a field regulating switch included in a FS circuit of the voltage regulator and reconfiguring a field enable switch included in the FS circuit to switch on/off the generator's field coil when the field regulating switch fails to switch on/off the field coil at least once within a pre-determined time interval.

In another aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method comprises monitoring an output of the generator and a switching interval of a first field regulating switch and a second field regulating switch included in a field switching (FS) circuit of the voltage regulator to ascertain one or more operating states of said generator and voltage regulator, and activating/deactivating the generator's field coil via a field enable switch included in the FS circuit according to the ascertained operating states. In one instance, the method comprises activating the field coil when the generator's output voltage is within a pre-determined output voltage range and the switching interval of the first and second field regulating switches are within a pre-determined time interval, and deactivating said field coil if these conditions are not met. In another instance, the method further comprises switching on/off the field enable switch when the first field regulating switch and/or the second field regulating switch fail to switch on/off the field coil within the pre-determined time interval.

In another aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method comprises monitoring an output of the generator and a switching interval of a first field regulating switch and a second field regulating switch included in a field switching (FS) circuit of the voltage regulator to ascertain one or more operating states of said generator and voltage regulator, and activating/deactivating the generator's field coil via a first field enable switch and/or a second field enable switch included in the FS circuit according to the ascertained operating states. In one instance, the method comprises activating the field coil when the generator's output voltage is within a pre-determined output voltage range and the switching interval of the first and second field regulating switches are within a pre-determined time interval, and deactivating said field coil if these conditions are not met. In another instance, the method further comprises switching on/off the first field enable switch and/or the second field enable switch when the first field regulating switch and/or the second field regulating switch fail to switch on/off the field coil within the pre-determined time interval.

In another aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method includes providing status indicators that communicate the operating states of the generator and voltage regulator to the vehicle electrical system. In one instance, the method provides communicating via visual indicators, diagnostic signals, and communication ports coupled with the vehicle computer system, or any combination thereof.

In another aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method includes automatically shutting off the FS circuit when there is excessive electrical current through the field coil due to either a turn-to-turn short or a grounded state.

In another aspect, a method is disclosed comprising monitoring and controlling a generator and a voltage regulator in a vehicle electrical system. The method comprises determining operating states of the generator and voltage regulator and providing redundant protection and improved warning to the vehicle electrical system. Preferably, the method includes further monitoring a stator phase signal and an energize signal to determine the operating states of the generator and voltage regulator. In one instance, the method comprises activating the field coil when both signals are present and deactivating it when either signal disappears.

The following claims define the present invention. The foregoing explanations, descriptions, illustrations, examples, and discussions regarding this, invention have been set forth to demonstrate the utility and novelty of this invention and are by no means restrictive of its scope.

DETAILED DESCRIPTION OF THE PRESENTLY PREFERRED EMBODIMENTS

Figure 1:
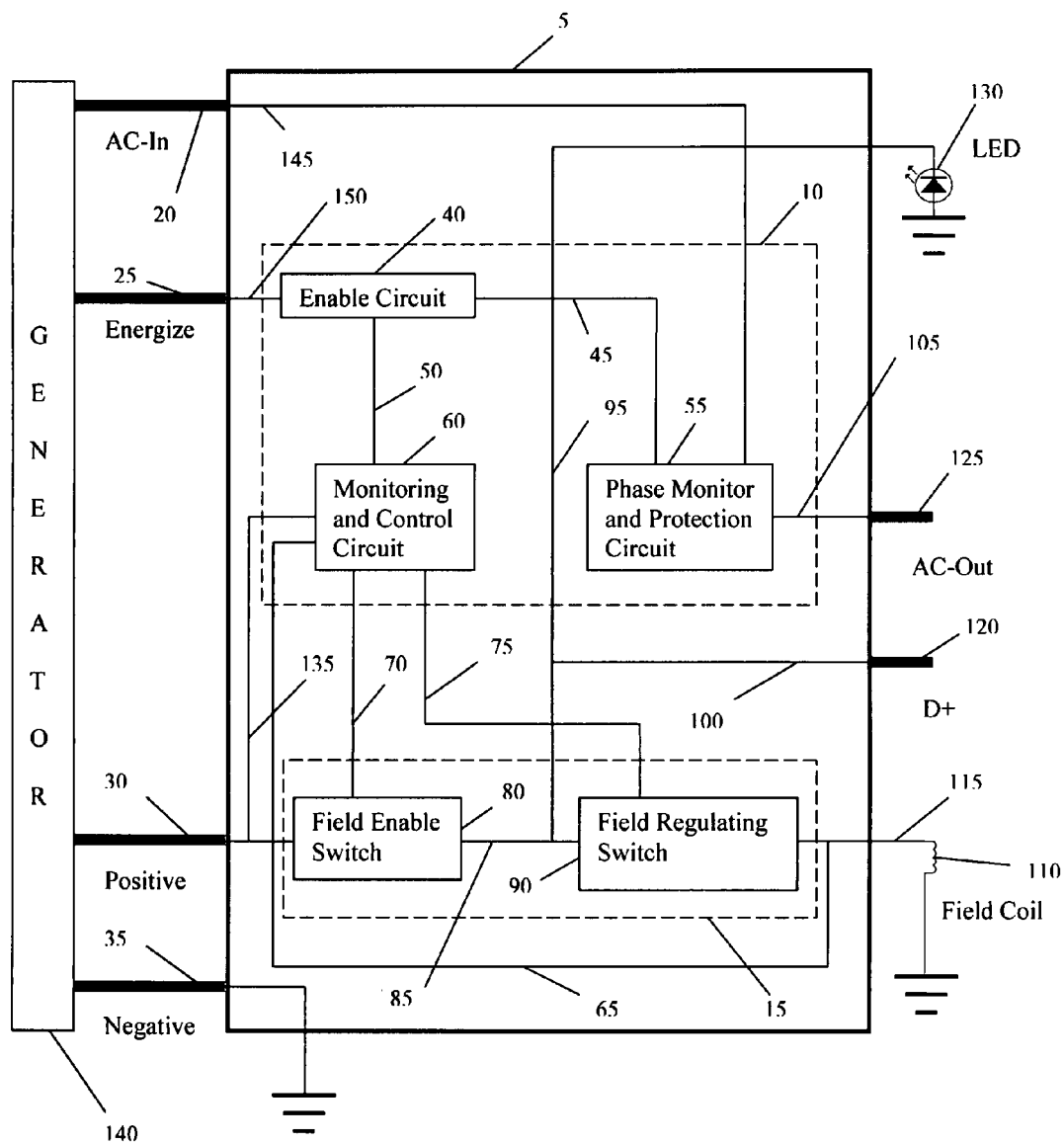
FIG. 1 shows a block diagram of a voltage regulator in a vehicle electrical system according to a preferred embodiment.

FIG. 1 depicts a block diagram of a preferred embodiment of a voltage regulator 5, connected to and in communication with a generator 140, included in a vehicle electrical system. The voltage regulator 5 operates to monitor, control, and protect the vehicle electrical system. The voltage regulator inputs comprise an AC-In line 20, an energize line 25, a positive line 30, and a negative line 35. The AC-In line 20 and energize line 25 are connected to the generator 140 wherein a signal on these lines are used by the voltage regulator 5 to determine operating states of the generator, and to initiate its power-up procedure. The positive line 30 is connected to an output of the generator 140 and utilized by the voltage regulator 5 to power the generator field coil 110, and monitor the generator's output. The negative line 35 provides a return route for the electrical current. The voltage regulator outputs comprise a field line 115, an AC-Out line 120, a D+ line 125, and a light emitting diode (LED) 130. The field line 115 is connected to the generator's field coil 110 wherein the voltage regulator 5 controls the field coil current to maintain a constant voltage. The AC-Out line 120 provides an output signal which may be used by the vehicle electrical system to obtain a rotational speed (RPM) of the generator 140. The D+ line 125 provides a warning signal as to the operating states of the voltage regulator 5 and the generator 140. The LED 130 complements the D+ line 125 in providing a visual warning signal. It is contemplated that in other embodiments, the AC-Out line 120 and the D+ line 125 may be connected to the vehicle computer network where the voltage regulator 5 provides information as to its own operating states and those of the generator 140. Other elements of the voltage regulator 5 include a monitor/control/protection (MCP) circuit 10 and a field switching (FS) circuit 15. The MCP circuit 10 includes an enable circuit 40, a monitoring and control circuit 60, and a phase monitor and protection circuit 55. The MCP circuit 10 is utilized to ascertain the operating states of the generator 140 and voltage regulator 5 and controls the FS circuit 15 accordingly. The FS circuit 15 comprises a field enable switch 80 and a field regulating switch 90. The FS circuit 15 operates to activate/deactivate the generator field coil 110 in response to said operating states, received from the MCP circuit 10. The field enable switch 80 and field regulating switch 90 are interchangeable and thus activating/deactivating, switching on/switching off, and shutting on/shutting off said switches involve the same process.

In one embodiment, the voltage regulator 5 is connected to and in communication with the generator 140, via the AC-In line 20, the energize line 25, the positive line 30, and the negative line 35. The AC-In line 20 carries an oscillating signal 145, a frequency of which is used to determine an RPM of the generator 140. If a signal is present on this line, it is indicative that the generator shaft is rotating and the generator 140 is capable of producing electrical power. The energize line 25 carries an energize signal 150 which is indicative that the vehicle engine has been turned on. According to one configuration, there maybe a signal 150 on the energize line 25 although the vehicle engine is not turning. Consequently, in this configuration both signals 145 and 150 must be present to indicate that the vehicle engine is running. It should be clear to those practiced in the art that presence and absence of a signal may be ascertained through its amplitude and/or frequency. The positive line 30 carries electrical current to the field coil 110. The MCP circuit 10 receives a signal 135, derived from the positive line 30, to determine the output voltage of the generator 140. The MCP circuit 10 utilizes one or a combination of signals from the AC-In line 20, the energize line 25, and the positive line 30 to ascertain operating states of the generator 140. The FS circuit 15 receives commands from the MCP circuit 10, corresponding to said operating states, to switch on/off a field signal 115.

In one embodiment, the MCP circuit 10, activates the generator field coil 110 via the FS circuit 15, assuming it ascertains that the FS circuit 15 is operating properly and that the signal 135 on the positive line 30 is within a pre-determined value, if both signals 145 and 150 are present and to deactivate it if either one is absent. Presence and absence of a signal maybe ascertained through its amplitude and/or frequency. For instance a voltage of the signal 150 at or above a certain level indicates its presence, and a voltage below such level indicates its absence. Similarly, a distinct frequency of the signal 145 indicates its presence, and otherwise its absence. It is contemplated that in other embodiments, the AC-In line 20 and the energize line 25 may be connected to the vehicle computer network where the voltage regulator 5 receives the signals 145 and 150 concerning the generator shaft's RPM and the on/off state of the vehicle engine for the purpose of ascertaining whether the generator 140 is operating properly. It is also contemplated that in other embodiments, instead of the AC-In line 20 and the energize line 25, a single sense line may be connected to the vehicle computer network where the voltage regulator 5 receives sufficient information to determine the generator shaft's RPM and the on/off state of the vehicle engine.

The voltage regulator 5 ascertains its own operating states and those of the generator's 140 via the MCP circuit 10. It achieves this via the enable circuit 40, the phase monitor and protection circuit 55, and the monitoring and control circuit 60. In one embodiment, the MCP circuit 10 ascertains whether the generator 140 is functioning properly by utilizing the AC-In line 20, the energize line 25, and the positive line 30. The MCP circuit 10 ascertains the operating states of the voltage regulator 5 by monitoring a field coil feedback signal 65 received from the FS circuit 15.

In one embodiment, the phase monitor and protection circuit 55 receives the signal 145 on the AC-In line 20 and generates a signal 45 and 105 if the signal 145 is present. The enable circuit 40 receives the signal 45 and the signal 150 on the energize line 25, and generates a signal 50 if both signals on the AC-In line 20 and the energize line 25 are present. The monitoring and control circuit 60 receives the signal 50, the signal 135, and the field coil feedback signal 65 from the FS circuit and generates signals 70 and 75 which control the field enable switch 80 and field regulating switch 90.

According to one embodiment, the monitoring and control circuit 60 monitors only the signals 135 and 65 and generates the signal 75 to switch on/off the field regulating switch 90 to regulate the generator's output power, and generates the signal 70 to activate/deactivate the field enable switch 80 to provide a redundant mechanism whereby the field coil 110 can be deactivated even if the field regulating switch 90 fails to function properly. Moreover, the operating states of the generator 140 and voltage regulator 5 are communicated via a signal 95, received form the FS circuit 15, to the vehicle electrical system.

For instance, the presence of signal 65 is indicative that the field regulating switch 90 is functioning properly and its absence means that it is operating improperly. A field regulating switch that is operating properly switches on/off the field coil at least once within a pre-determined time interval. Similarly, a voltage level sensed on the signal 135 that is within a pre-determined value indicates that the generator 140 is functioning properly. Accordingly, when both signals 65 and 135 satisfy the described conditions, the monitoring and control circuit 60 generates the signal 70 to instruct the FS circuit 15 to activate the field coil 110 and to deactivate it when either signal 135 or 65 fails to meet the described conditions. The FS circuit 15 generates the signal 95 that provides information regarding the operating states of the generator 140 and voltage regulator 5. In one embodiment, the signal 95 is used via a diagnostic terminal 125 and/or a light emitting diode (LED) 130 to communicate said operating states. In one embodiment, the FS circuit 15 deactivates the field coil 110 if the diagnostic terminal 125 is inadvertently grounded.

The voltage regulator 5 is capable of reconfiguring its components so that it may continue normal operation even when certain components fail to function properly. Specifically, it reconfigures a protective component such as the field enable switch 80 to function as an operative component such the field regulating switch 90, when the latter fails to function properly. The voltage regulator 5 achieves this via the MCP circuit 10 by monitoring a switching interval of the FS circuit 15.

According to one embodiment, the MCP circuit 10 is configured such that the monitoring and control circuit 60 monitors only the field coil feedback signal 65 and generates a signal 70 to switch on/off the field enable switch 80 to regulate the generator's output power when the field regulating switch 90 fails to switch on/off the field coil 110 at least once within a pre-determined time interval. For instance, if the field regulating switch 90 fails in a short circuit mode, the signal 65 will be absent. According to this embodiment, the MCP circuit 10 switches on/off the field coil 110 via the field enable switch 80 instead of the field regulating switch 90. Such reconfiguration of a protective component such as the field enable switch 80 into an operative component such as the field regulating switch 90 is an important aspect of the present invention in that it allows the voltage regulator to continue normal operation without additional redundancy in the electrical system. The FS circuit 15 generates a signal 95 that provides information to the vehicle electrical system regarding such reconfiguration in a manner similar to that described above.

Figure 2:
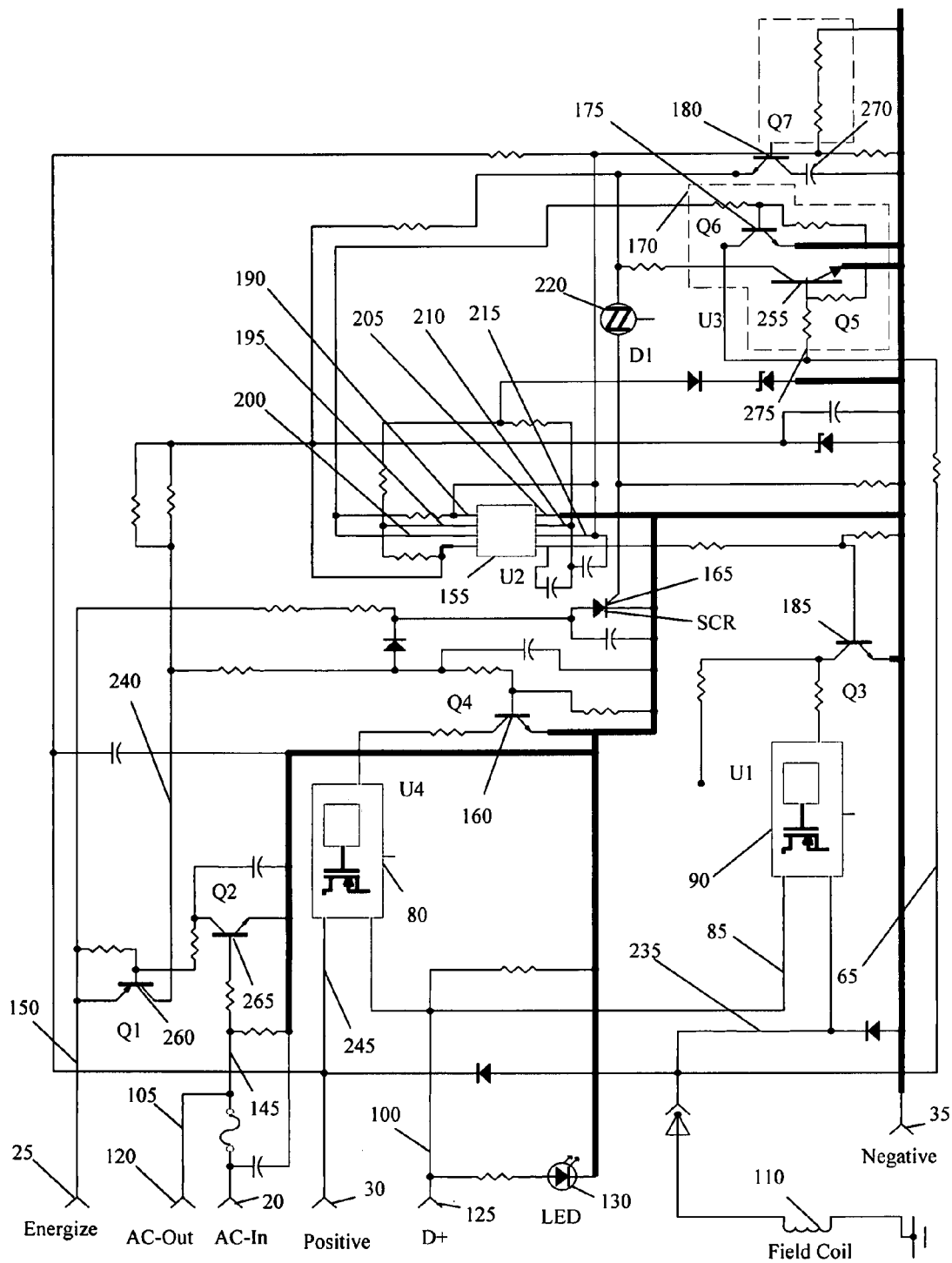
FIG. 2 is a schematic diagram of a preferred embodiment of the voltage regulator of FIG. 1.

FIG. 2 depicts a schematic diagram of a preferred embodiment of a voltage regulator 5 as an electrical circuit. In this embodiment, transistors 260 and 265 are connected to the energize terminal 25 and the AC-In terminal 20 and operate to provide signals that are used in determining the operating states of the generator 140 and on/off state of a vehicle engine. Field enable switch 80 and field regulating switch 90 are connected in series and operate to control the switching operation of the generator's field coil 110. Integrated circuit (IC) 155, transistors 160, 175, 180, 185, 225, silicon controlled rectifier (SCR) 165, and trigger diode 220 are utilized to ascertain the operating states of the generator 140 and the voltage regulator 5, and to control the operation of the field enable switch 80 and the field regulating switch 90. D+ terminal 125 and LED 130 are utilized to communicate said operating states to the vehicle electrical system.

In one embodiment, the source terminal of the transistor 260 is connected to the energize terminal 25 and a voltage of the energize signal 150 is applied to the IC 155 via a signal 240, derived from the drain terminal of the transistor 260. The signal 240 is generated only when the transistor 260 is triggered by the transistor 265. Transistor 265 is connected to the AC-in terminal and is triggered by the AC signal 145. Consequently, according to this embodiment, both the AC signal 145 and the energize signal 150 are required by the IC 155 to determine the operating state of the generator 140. The absence of either the AC signal 145 or the energize signal 150 indicates that the generator is not operating properly.

In one embodiment, the IC 155 comprises two comparators that are utilized to monitor and control the output voltage of the generator 140 and the switching operation of the voltage regulator 5. The IC 155 uses input lines 190 and 195 to monitor the output voltage of the generator 140 and uses input lines 205 and 210 to monitor the switching operation of the field regulating switch 90. The IC 155 uses an output line 200 to activate/deactivate the field enable switch 80 in response to the output voltage of the generator 140 and uses output line 215 to control the switching operation of the field regulating switch 90, also in response to the generator's output voltage. The output line 215 switches on/off the field regulating switch 90 via the transistor 185. The output line 200 activates/deactivates the field enable switch 80 via the transistors 175, 255, 160, the trigger diode 220, and the SCR 165.

In one embodiment, the input line 190 and 195 are used to compare the generator's output voltage with a reference voltage. The IC 155 deactivates the field enable switch 80 via the output line 200 when an over voltage condition is detected. For instance, in a vehicle electrical system where the system voltage is set to operate at 28 Volts, the IC 155 deactivates the field enable switch 80 when a voltage of 33 Volts is detected. In order to avoid inadvertent deactivation of the field enable switch 80 due to voltage transients, the circuit includes transistor 180 and capacitor 270 so that the field enable switch 80 is deactivated when the over voltage condition lasts for a pre-determined time interval, say three (3) seconds.

In one embodiment, the field enable switch 80 is independently activated/deactivated in response to operating states of the generator 140, via the transistors 175, 255, 160, the trigger diode 220, and the SCR 165. When an over voltage condition is detected, the IC 155 triggers the transistor 175 via the output line 200. The transistor 175 triggers the transistor 255 via an input line 275 which causes the trigger diode 220 to trigger the SCR 165 which, in turn, triggers the transistor 165. When the transistor 165 is triggered, it deactivates the field enable switch 80 which cuts off electrical current from the positive line 245 to the field regulating switch 90 at 85. Upon activation/deactivation of the field enable switch 80, a signal 100 is generated that provides status information as to the operating states of the generator 140, via the D+ terminal 125 and the LED 130.

In one embodiment, the field enable switch 80 is independently activated/deactivated in response to operating states of the voltage regulator 5, via the transistors 175, 255, 160, the trigger diode 220, and the SCR 165. When the field regulating switch 90 is operating properly, the field coil 110 must necessarily be switched on/off within a pre-determined time interval, for instance fifty (50) milliseconds. A field coil feedback signal 65 operates upon the transistor 255 which causes the field enable switch 80 to be activated/deactivated via the trigger diode 220, the SCR 165, and the transistor 160 as described above. Upon activation/deactivation of the field enable switch 80, a signal 100 is generated that provides status information as to the operating states of the voltage regulator 5, via the D+ terminal 125 and the LED 130.

In one embodiment, the field enable switch 80 is reconfigured to switch on/off the field coil 110 instead of deactivating it when the field regulating switch 90 fails in a short circuit mode. According to this embodiment, when the field coil feedback signal 65 is indicative of a shorted field regulating switch 90, the field coil 110 is switched on/off via the field enable switch 80 so that the voltage regulator 5 may continue normal operation. Upon the reconfiguration of the field enable switch 80, a signal 100 is generated that provides status information as to such reconfiguration of the field enable switch 80, via the D+ terminal 125 and the LED 130.

Figure 3:
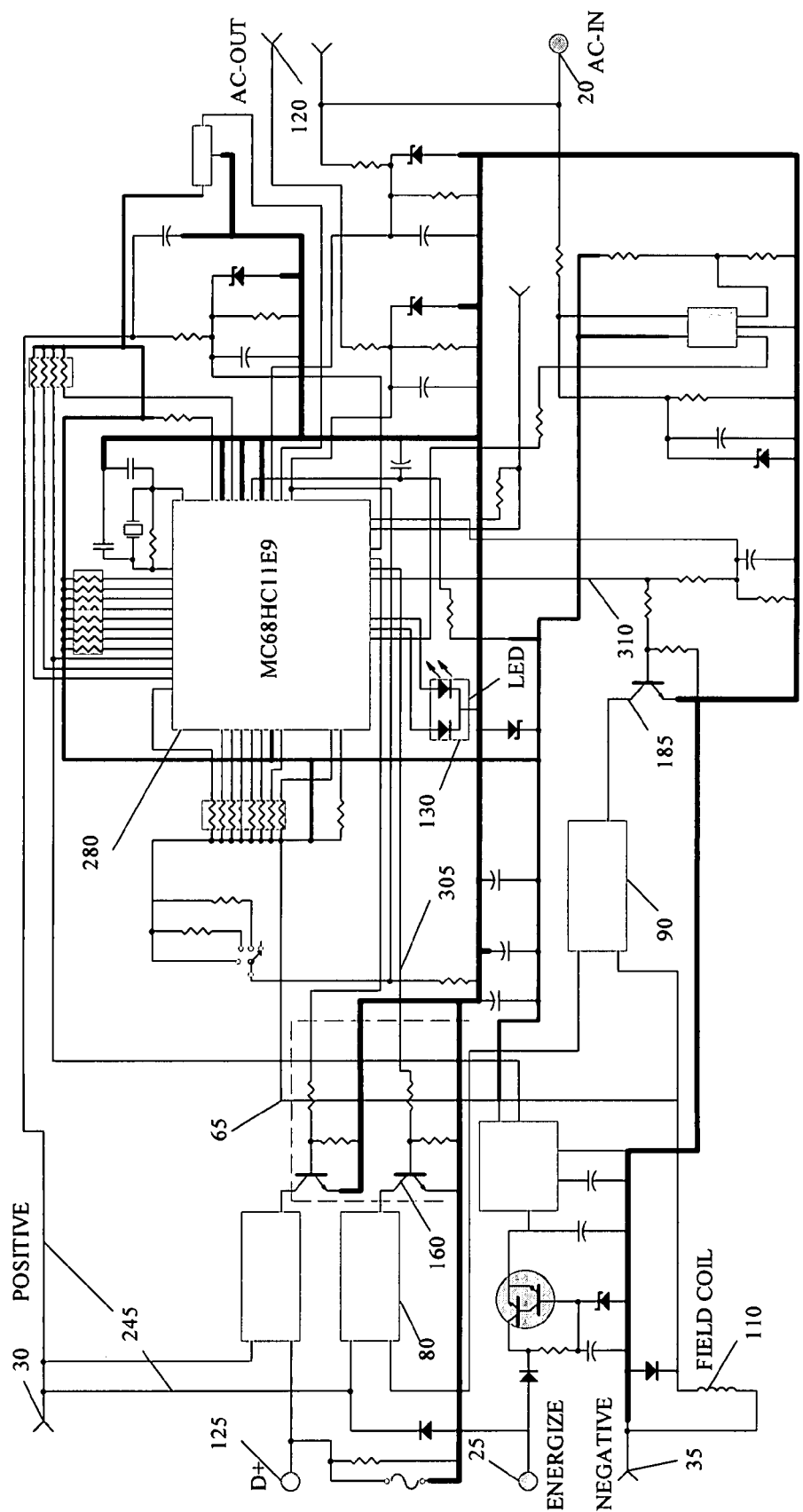
FIG. 3 is a schematic diagram of a preferred embodiment of the voltage regulator of FIG. 1 implementing a processor.

FIG. 3 depicts a schematic diagram of a preferred embodiment of a voltage regulator 5 implementing a processor 280. In this embodiment, the processor 280 performs similar tasks as those using analog components as illustrated in FIG. 2. The processor 280 receives input signals similar to those received by the MCP circuit 10. The processor 280 is connected to the positive line 30, the energize terminal 25, and the AC-In terminal 20 to ascertain the operating states of the generator 140 and on/off state of a vehicle engine. The processor 280 is further connected to the field coil 110 and receives a field coil feedback signal 65 to ascertain the operating states of the voltage regulator 5. Field enable switch 80 and field regulating switch 90 are connected in series and operate to switch on/off the field coil 110. Transistors 160 and 185 are triggered by the processor via signals 305 and 310 and are utilized to activate/deactivate the field enable switch 80 and field regulating switch 90. The processor 280 is further capable of reconfiguring a protective component such as the field enable switch 80 to operate as an operative component such as the field regulating switch 90 when the latter fails to function properly. The processor 280 communicates the operating states of the generator 140 and the voltage regulator 5 to the vehicle electrical system via the LED 130 and D+ terminal 125.

In one embodiment, the processor 280 monitors an output voltage of the generator 140 via the signal 245 to ascertain the operating states of the generator 140, and monitors a field coil feedback signal 65 to ascertain the operating states of the voltage regulator 5. The processor 280 activates the field coil 110 via the field enable switch 80 when the generator 140 and voltage regulator 5 are operating properly and deactivates the field coil via the field enable switch 80 when either the generator 140 or the voltage regulator 5 operates improperly. The processor achieves this by applying a signal 305 to the transistor 160. The processor 280 switches on/off the field coil 110 via the field regulating switch 90 to regulate the generator's output. The processor 280 achieves this by applying a signal 310 to the transistor 185.

In one embodiment, the processor 280 reconfigures the field enable switch 80 to take on the operation of the field regulating switch 90 when the latter fails. Specifically, the processor 280 monitors the signal 65 and switches on/off the field coil 110, via the field enable switch 80 when the field regulating switch 90 fails in a short circuit mode. When the field regulating switch 90 fails in a short circuit mode, it fails to switch on/off the field coil 110 at least once within a pre-determined time interval. The processor 280 may be configured to re-start an internal timer every time it encounters either a falling edge or a rising edge in the signal 65. This embodiment permits the regulator 5 to operate properly even when the field regulating switch 90 and/or the field enable switch 80 fail in a short circuit mode. The processor 280 communicates such reconfiguration of the field enable switch 80 and the failure of the field regulating switch 90 to the vehicle electrical system via the LED 130 and D+ terminal 125.

Figure 4:
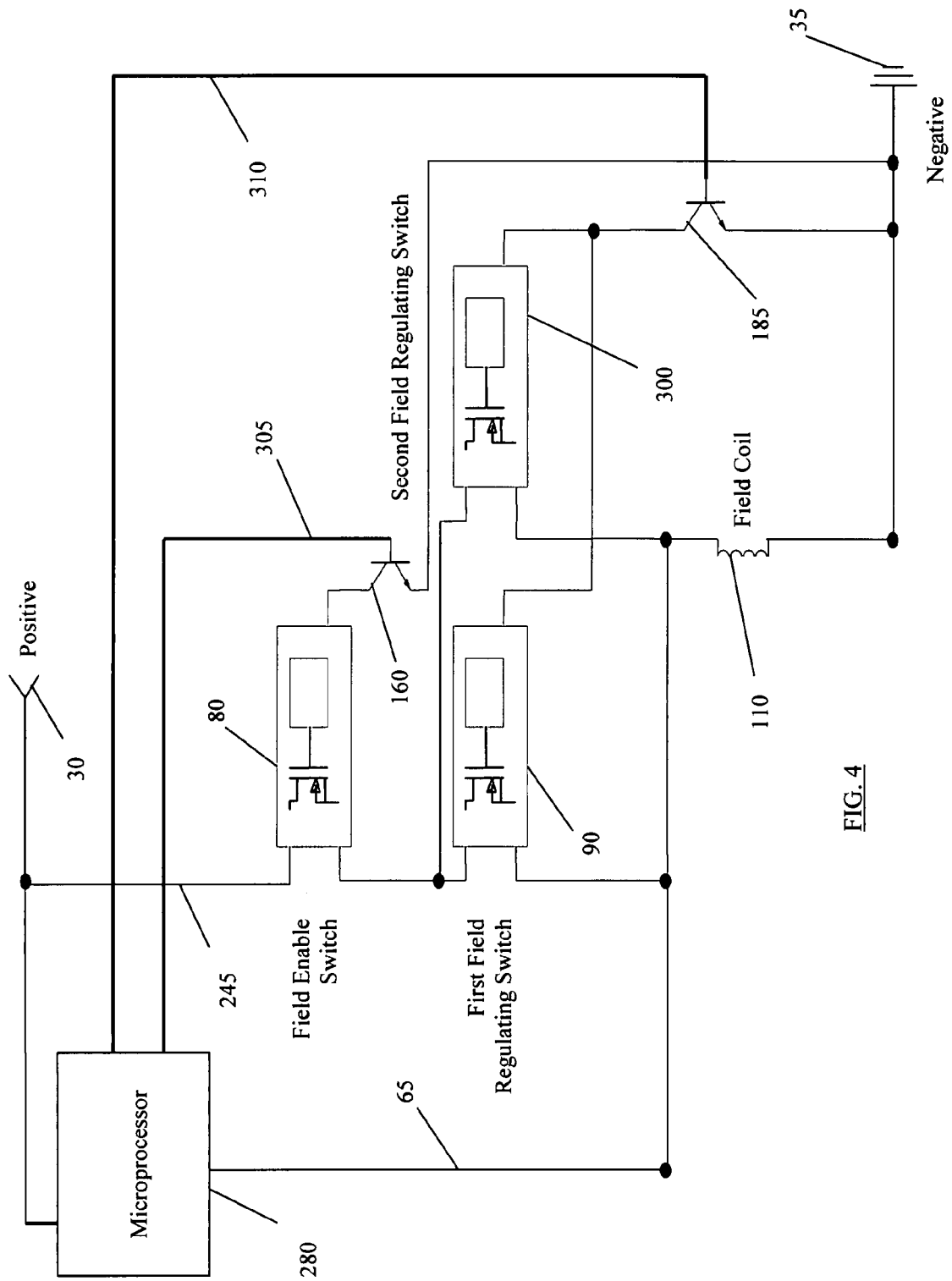
FIG. 4 is a schematic diagram of a field switching circuit according to a preferred embodiment.

In one embodiment, depicted in FIG. 4, the voltage regulator utilizes a first and a second field regulating switches 90 and 300, respectively. The first and second field regulating switches 90 and 300 are connected in a parallel configuration, allowing the processor 280 to switch on/off the field coil 110 independently by applying a signal 310 to the transistor 185. The switching operation of the first and second field regulating switches 90 and 300 is monitored by the processor 280 via a signal 65. The processor 280 activates/deactivates the field enable switch 80 when the first and second field regulating switches are operating properly/improperly as described above, by applying a signal 305 to the transistor 160. This embodiment permits the voltage regulator 5 to operate properly when the field enable switch 80 fails in a short circuit mode, and/or the first and second field regulating switches fail either in short circuit or open circuit mode, simultaneously. The processor 280 communicates the failure to the vehicle electrical system via the LED 130 and D+ terminal 125.

Figure 5:
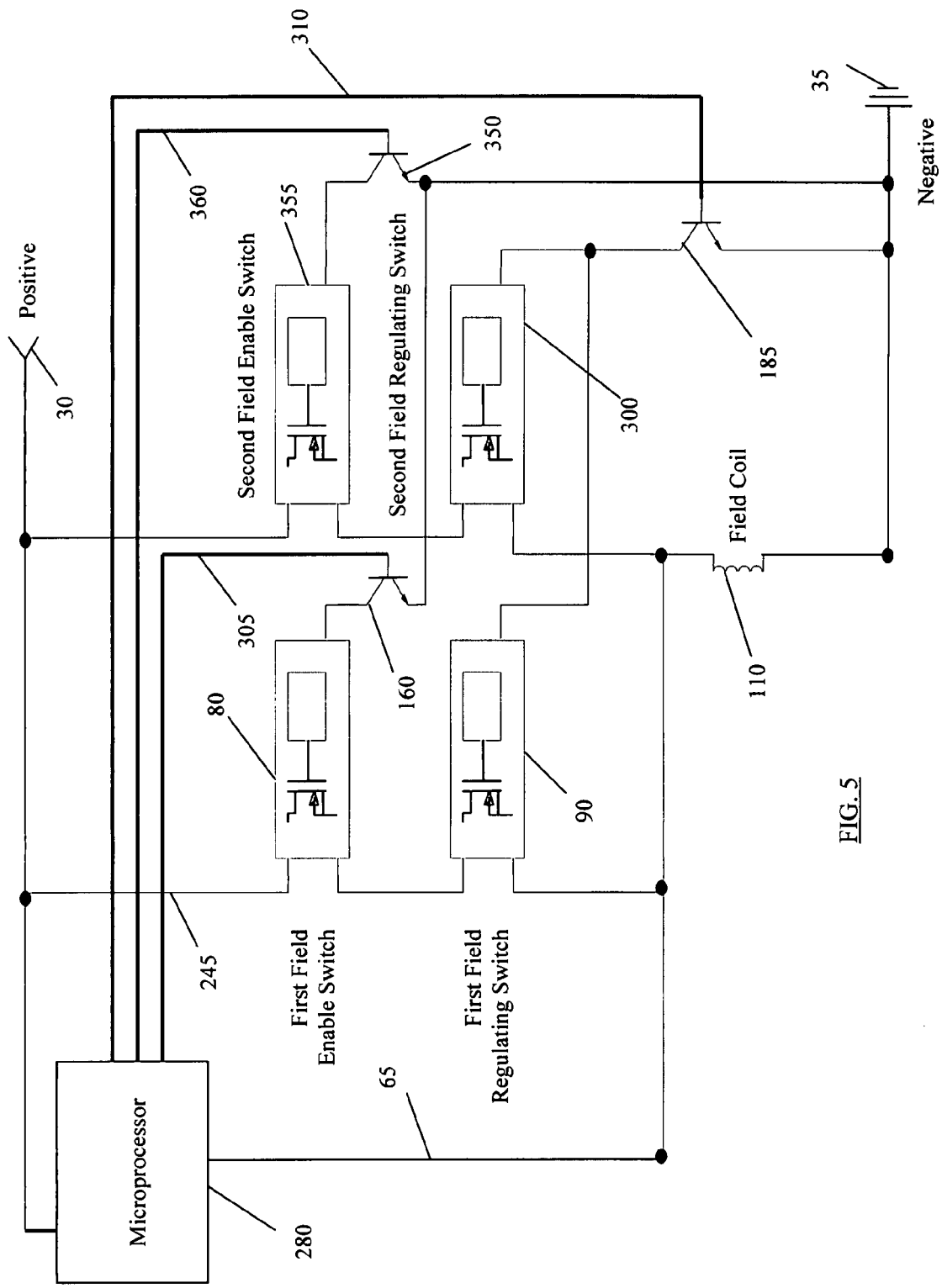
FIG. 5 is a schematic diagram of a field switching circuit according to a preferred embodiment.

In one embodiment, depicted in FIG. 5, the voltage regulator utilizes a first and a second field enable switches 80 and 355, respectively, and a first and a second field regulating switches 90 and 300, respectively. The processor 280 switches on/off the field coil 110 via the first and second field regulating switches 90 and 300 by applying a signal 310 to the transistor 185. The processor 280 activates/deactivates the field coil 110 via the first and second field enable switches 80 and 355 by applying a signal 305 to the transistor 160 and a signal 360 to the transistor 350. This embodiment permits the voltage regulator 5 to operate properly when the filed enable switches 80 and 355 fail either in a in a short-circuit or open-circuit mode, and/or the first and second field regulating switches fail either in short-circuit or open-circuit mode, simultaneously. The processor 280 communicates the failure to the vehicle electrical system via the LED 130 and D+ terminal 125.

Utilizing the system described in FIG. 1, one embodiment of the operation of voltage regulator 5 is now described. The voltage regulator 5 utilizes a signal 145 on an AC-In line 20, a signal 150 on an energize line 25, a signal 135 on a positive line 30, or any combination thereof, in ascertaining operating states of a generator 140. The voltage regulator 5 comprises a MCP circuit 10 and a FS circuit 15. The MCP circuit 10 is utilized to ascertain the operating states of the generator and the FS circuit 15. The FS circuit 15 is utilized to control the generator's output power and provide redundant system protection via a signal 115 operative on a field coil 110. The voltage regulator 5 utilizes a signal 95, a signal 100, a signal 105 or any combination thereof to communicate said operating states of the generator 140 and the voltage regulator 5 to a vehicle electrical system.

In one situation, the voltage regulator 5 utilizes the signals 145 and 150 to ascertain the operating states of the generator 140. Presence of the signal 145 indicates that the generator's shaft is rotating. Presence of the signal 150 indicates that the vehicle engine is operating. Ordinarily, the generator is driven by the vehicle engine via a driving belt. When the belt is broken or loose, the generator's shaft stops rotating and the signal 145 is absent, while the signal 150 is present. The voltage regulator 5 deactivates the field coil 110 via the signal 115 and generates the signal 105 to communicate the generator's shaft status.

In one situation, the voltage regulator 5 utilizes the signals 145 and 150 to ascertain the operating states of the generator 140. Presence of the signal 145 indicates that the generator's shaft is rotating. Presence of the signal 150 indicates that the vehicle engine is operating. In most vehicle electrical systems, the signal 150 is generated by a device, say an oil pressure switch, that turns on when the vehicle engine is operating. In a system where there is no such switch, the signal 150 is generated when the vehicle ignition switch turns on without the engine actually operating. However, the signal 145 is absent because the generator's shaft is not rotating. The voltage regulator 5 deactivates the field coil 110 via the signal 115 and generates the signal 105 to communicate the generator's shaft status.

In one situation, the voltage regulator 5 utilizes the FS circuit 15 to provide redundant system protection and regulate the generator's output power by including a field enable switch 80 and a field regulating switch 90. The MCP circuit 10 monitors and controls these switches to determine the operating states of the FS circuit 15. Ordinarily, only a field regulating switch 90 is utilized to regulate the generator's output by switching on/off the signal 115 which turns on/off the field coil 110. When the field regulating switch 90 fails as a short circuit, the signal 115 turns on and remains on causing system over voltage. By including the field enable switch 80, the MCP circuit 10 is capable of turning off the field coil 110 even when the field regulating switch 90 is inoperative, thus providing a redundant system protection. When the field enable switch 80 is deactivated, the signal 95 and 100 are generated to communicate the status of the field enable switch 80.

In one situation, the voltage regulator 5 utilizes the FS circuit 15 to provide redundant system protection and regulate the generator's output power by including a field enable switch 80 and a field regulating switch 90. A signal 65 is monitored to ascertain whether the field regulating switch 90 is operating properly, i.e., switching on/off the field coil 110 at least once within a pre-determined time interval. The MCP circuit 10 monitors the signal 65 and deactivates the field enable switch 80 if the signal 65 is not present, independently and irrespective of any over voltage condition that may or may not arise. When the field enable switch 80 is deactivated, the signal 95 and 100 are generated to communicate the status of the field enable switch 80.

In one situation, the voltage regulator 5 reconfigures a protective component such as the field enable switch 80 to function as an operative component such as the field regulating switch 90. When the field regulating switch 90 fails in a short circuit mode, the MCP circuit 10 switches on/off the field enable switch 80 to ensure proper operation of the vehicle electrical system until the latter is repaired. The signal 95 and 100 are generated to communicate the status of the field regulating switch 90.

Figure 6:
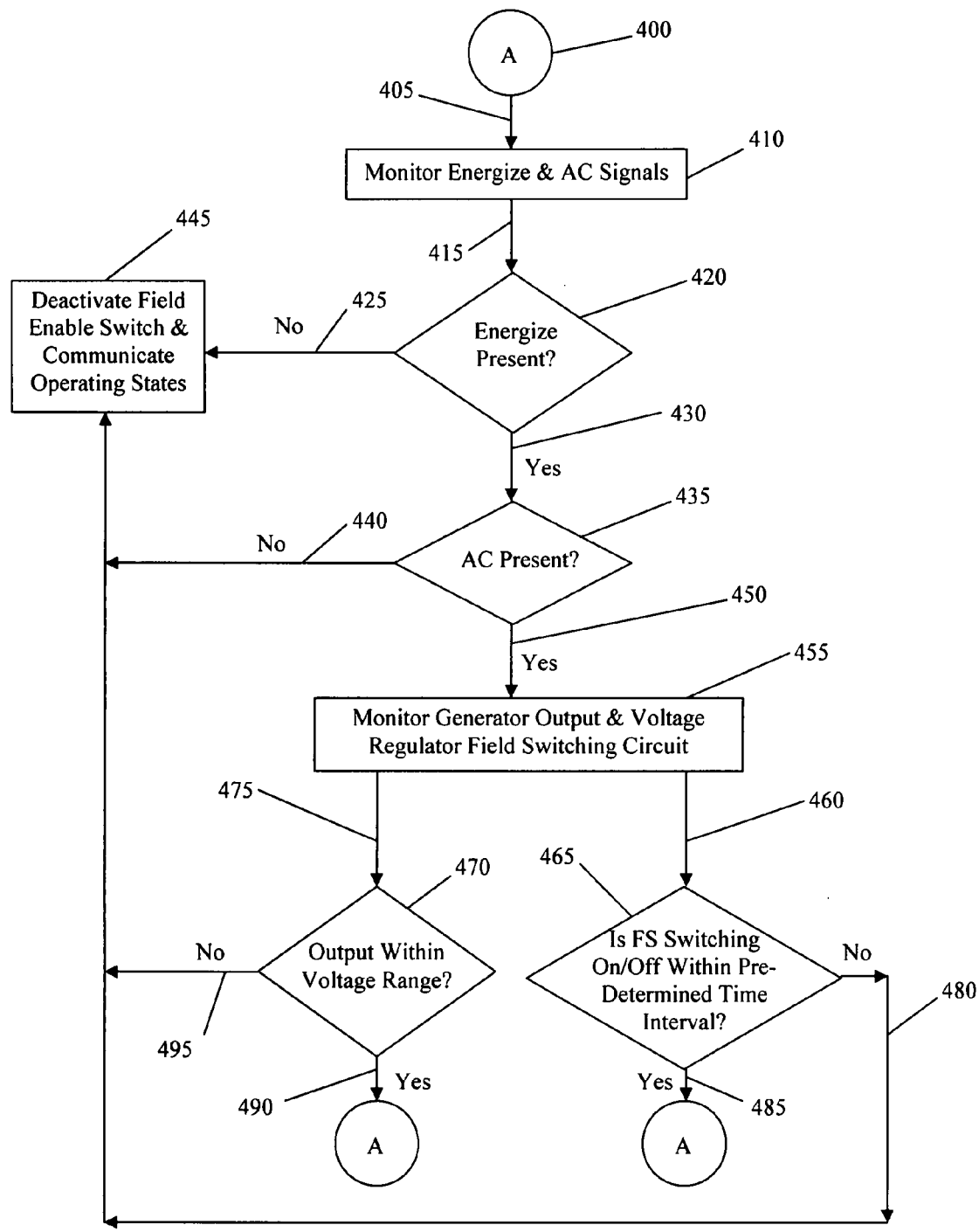
FIG. 6 is a flow diagram of one preferred method of operation of the voltage regulator of FIG. 1.

FIG. 6 illustrates an example of one method of operating the voltage regulator 5. Upon power up, the voltage regulator monitors the energize and AC signals at 410. It determines whether the energize signal is present at 420. If the energize signal is absent, it generates a signal 425 whereby the field enable switch is deactivated and the operating state is communicated to the vehicle electrical system at 445. If the energize signal is present, it continues to ascertain the presence of the AC signal at 435. If there is no AC signal present, a signal 440 is generated which deactivates the field enable switch and communicates the operating state to the vehicle electrical system at 445.

The voltage regulator 5 monitors the generator's output and its field switching circuit at 455. It determines whether the generator output voltage is within a pre-determined voltage range at 470. If the generator's output is not within the pre-determined voltage range, it generates a signal 495, deactivating the field enable switch and communicating the operating state at 445.

The voltage regulator 5 monitors the generator's output and its field switching circuit at 455. It determines whether the field switching circuit is operating properly by monitoring its switching operation. If the field switching circuit fails to switch on/off within a pre-determined time interval, a signal 480 is generated that deactivates the field enable switch and communicates the operating state at 445.

Figure 7:
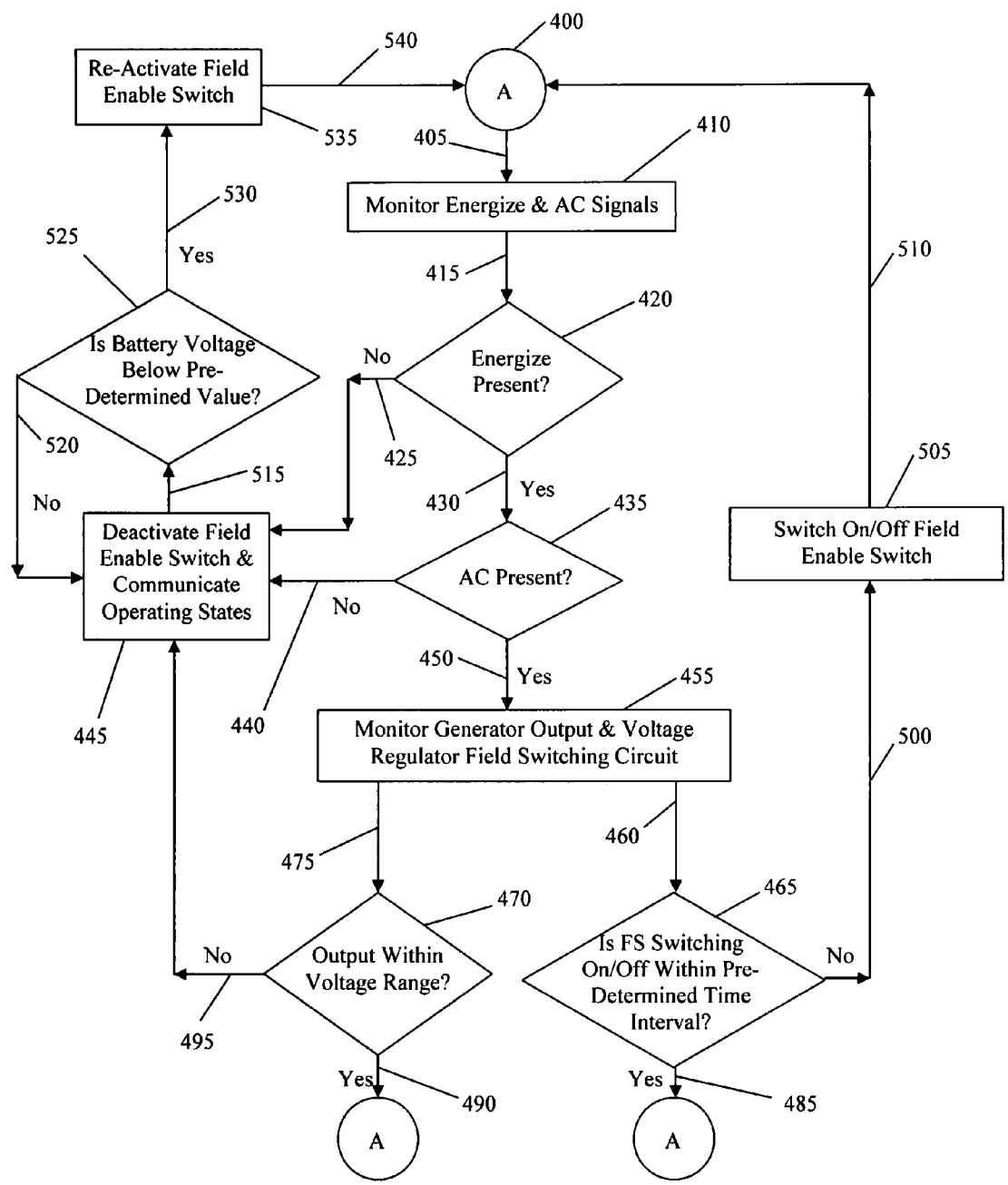
FIG. 7 is a flow diagram of one preferred method of operation of the voltage regulator of FIG. 1.

FIG. 7 illustrates an example of one method of operating the voltage regulator 5. The method includes processes described in FIG. 6. In addition, the method includes reconfiguring a protective component of the voltage regulator 5, such as the field enable switch 80, into an operative component such as the field regulating switch 90. The method includes switching on/off a field enable switch at 505, when the FS circuit fails to switch on/off the field coil within a pre-determined time interval. The method further includes monitoring a voltage of a battery, included in the vehicle electrical system, to determine if said voltage is below a pre-determined value at 525. If the battery voltage is below the pre-determined value, the field enable switch is re-activated at 535.

The forgoing discloses a voltage regulator included in a vehicle electrical system comprising a generator, whereby the voltage regulator ascertains its own operating states and those of the generator's. The voltage regulator operates on the generator's field coil to control its operation and provide redundant protection to the vehicle electrical system. The voltage regulator communicates the operating states to the vehicle electrical system.

The voltage regulator ascertains the generator's operating states by monitoring signals indicative of the generator's shaft RPM, the generator's output voltage, the vehicle's engine on/off state, or any combination thereof. The voltage regulator ascertains its own operating states by monitoring a signal indicative of a switching interval derived from its switching transistors. The voltage regulator includes two switching transistors connected in series to provide redundant protection in case one of the switching transistors fails.

The examples and illustrations have been used to assist the reader with understanding this invention and not intended to limit the scope of it. It is the following claims, including all equivalents, which are intended to define the scope of this invention.

What is claimed is:

1. A voltage regulator for a generator in a vehicle, said generator comprising a field coil, said voltage regulator comprising:
   (a) a field enable switch;
   (b) a field regulating switch responsive to said field enable switch and operative to switch on/off said field coil; and
   (c) a processor, including a programming code operable on the processor, coupled with an output of said generator and said field enable and field regulating switches;
   wherein said processor is configured to ascertain one or more operating states of said generator and voltage regulator by monitoring the output of said generator and a switching interval of said field regulating switch, and wherein the processor is configured to activate/deactivate said field enable switch in response to said one or more operating states.

2. The voltage regulator of claim 1, wherein said processor is configured to activate said field enable switch when said one or more operating states of said generator and voltage regulator correspond to a properly operating state of said generator and a properly operating state of said voltage regulator, and to deactivate said field enable switch when said one or more operating states of said generator and voltage regulator correspond to an improperly operating state of said generator or an improperly operating state of said voltage regulator.

3. The voltage regulator of claim 1, wherein said processor is further configured to switch on/off said field enable switch when said field regulating switch fails to switch on/off said field coil at least once within a pre-determined time interval.

4. A voltage regulator for a generator in a vehicle, said generator comprising a field coil, said voltage regulator comprising:
 (a) a field enable switch;
 (b) a first field regulating switch responsive to said field enable switch and operative to switch on/off said field coil;
 (c) a second field regulating switch responsive to said field enable switch and operative to switch on/off said field coil; and
 (d) a processor, including a programming code operable on the processor, coupled with an output of said generator and said field enable, first field regulating, and second field regulating switches;
 wherein said processor is configured to ascertain one or more operating states of said generator and voltage regulator by monitoring the output of said generator and a switching interval of said first and second field regulating switches, and wherein the processor is configured to activate/deactivate said field enable switches in response to said one or more operating states.

5. The voltage regulator of claim 4, wherein said processor is configured to activate said field enable switch when said one or more operating states of said generator and voltage regulator correspond to a properly operating state of said generator and a properly operating state of said voltage regulator, and to deactivate said field enable switch when said one or more operating states of said generator and voltage regulator correspond to an improperly operating state of said generator or an improperly operating state of said voltage regulator.

6. A voltage regulator for a generator in a vehicle, said generator comprising a field coil, said voltage regulator comprising:
 (a) a first field enable switch;
 (b) a first field regulating switch responsive to said first field enable switch and operative to switch on/off said field coil;
 (c) a second field enable switch;
 (d) a second field regulating switch responsive to said second field enable switch and operative to switch on/off said field coil; and
 (e) a processor, including a programming code operable on the processor, coupled with an output of said generator and said first field enable, second field enable, first field regulating, and second field regulating switches;
 wherein said processor is configured to ascertain one or more operating states of said generator and voltage regulator by monitoring the output of said generator and a switching interval of said first and second field regulating switches, and wherein the processor is configured to activate/deactivate said first and second field enable switches in response to said one or more operating states.

7. The voltage regulator of claim 6, wherein said one or more operating states of said voltage regulator comprises at least one of a properly operating state and an improperly operating state, wherein a properly operating state of said voltage regulator corresponding to said first or second field regulating switches switching on/off said field coil at least once within a pre-determined time interval, and an improperly operating state of said voltage regulator corresponding to said first and second field regulating switches failing to switch on/off said field coil at least once within said pre-determined time interval.

8. The voltage regulator of claim 6, wherein said processor is configured to activate said first and second field enable switches when said one or more operating states of said generator and voltage regulator correspond to a properly operating state of said generator and a properly operating state of said voltage regulator, and to deactivate said first and second field enable switches when said one or more operating states of said generator and voltage regulator correspond to an improperly operating state of said generator or an improperly operating state of said voltage regulator.

9. A voltage regulator for a generator in a vehicle, said generator comprising a field coil, said voltage regulator comprising:
 (a) a field enable switch;
 (b) a field regulating switch responsive to said field enable switch and operative to switch on/off said field coil; and
 (c) a processor, including a programming code operable on the processor, coupled with said field enable and field regulating switches;
 wherein said processor is configured to monitor a switching interval of said field regulating switch, and to reconfigure the field enable switch to switch on/off said field coil when the field regulating switch fails to switch on/off said field coil at least once within a pre-determined time interval.

10. The voltage regulator of claim 1, further comprising means for communicating said one or more operating states of said generator and voltage regulator.

11. The voltage regulator of claim 1, wherein said one or more operating states of said generator comprises at least one of a properly operating state and an improperly operating state, wherein a properly operating state of said generator corresponding to said generator output voltage residing within a pre-determined output voltage range, and an improperly operating state of said generator corresponding to said generator output voltage residing outside of said pre-determined output voltage range.

12. The voltage regulator of claim 1, wherein said one or more operating states of said voltage regulator comprises at least one of a properly operating state and an improperly operating state, wherein a properly operating state of said voltage regulator corresponding to said field regulating switch switching on/off said field coil at least once within a pre-determined time interval, and an improperly operating state of said voltage regulator corresponding to said field regulating switch failing to switch on/off said field coil at least once within said pre-determined time interval.

13. The voltage regulator of claim 2, wherein said processor is further configured to re-activate said field enable switch when a voltage of a battery coupled with the generator falls below a pre-determined value.

14. The voltage regulator of claim 1, wherein said generator further comprises a rotary shaft coupled with an engine of said vehicle.

15. The voltage regulator of claim 14, further comprising a first terminal carrying a first signal proportional to a rotational speed of said shaft.

16. The voltage regulator of claim 15, wherein said processor is configured to monitor said first signal and to deactivate said field enable switch when said first signal is absent.

17. The voltage regulator of claim 14, further comprising a second terminal carrying a second signal proportional to an on/off state of said engine.

18. The voltage regulator of claim 17, wherein said processor is configured to monitor said second signal and to deactivate said field enable switch when said second signal is absent.

19. The voltage regulator of claim 4, wherein said one or more operating states of said generator comprises at least one of a properly operating state and an improperly operating state, wherein a properly operating state of said generator corresponding to said generator output voltage residing within a pre-determined output voltage range, and an improperly operating state of said generator corresponding to said generator output voltage residing outside of said pre-determined output voltage range.

20. The voltage regulator of claim 4, wherein said one or more operating states of said voltage regulator comprises at least one of a properly operating state and an improperly operating state, wherein a properly operating state of said voltage regulator corresponding to said field regulating switch switching on/off said field coil at least once within a pre-determined time interval, and an improperly operating state of said voltage regulator corresponding to said field regulating switch failing to switch on/off said field coil at least once within said pre-determined time interval.

21. The voltage regulator of claim 6, wherein said one or more operating states of said generator comprises at least one of a properly operating state and an improperly operating state, wherein a properly operating state of said generator corresponding to said generator output voltage residing within a pre-determined output voltage range, and an improperly operating state of said generator corresponding to said generator output voltage residing outside of said pre-determined output voltage range.

* * * * *